US010999732B2

(12) United States Patent
Ward et al.

(10) Patent No.: US 10,999,732 B2
(45) Date of Patent: *May 4, 2021

(54) MOBILE APPLICATION CONFIGURATIONS TO ENABLE DATA TRANSFERS

(71) Applicant: PAYPAL, INC., San Jose, CA (US)

(72) Inventors: Kevin Ward, Sacramento, CA (US); Vijeyta Aggarwal, Sunnyvale, CA (US); Larry Lingjer Wang, San Jose, CA (US); Mayank Chaudhary, Union City, CA (US); Nischitha Thimmappa Gowda Sundaramma, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,243

(22) Filed: Mar. 17, 2020

(65) Prior Publication Data
US 2020/0221287 A1  Jul. 9, 2020

Related U.S. Application Data

(63) Continuation of application No. 15/882,831, filed on Jan. 29, 2018, now Pat. No. 10,595,192, which is a
(Continued)

(51) Int. Cl.
H04M 3/42      (2006.01)
H04W 8/20      (2009.01)
H04W 8/18      (2009.01)
G06F 8/61       (2018.01)
G06Q 30/02    (2012.01)
H04W 4/60      (2018.01)
(Continued)

(52) U.S. Cl.
CPC ............... *H04W 8/20* (2013.01); *G06F 8/61* (2013.01); *G06Q 20/10* (2013.01); *G06Q 20/322* (2013.01); *G06Q 20/3674* (2013.01); *G06Q 30/0276* (2013.01); *H04W 4/60* (2018.02); *H04W 8/183* (2013.01); *H04W 88/02* (2013.01)

(58) Field of Classification Search
CPC ............... H04W 8/18; G06Q 20/3821; G06Q 20/38215; G06F 3/0482; H04M 1/2477; H04N 1/00408
See application file for complete search history.

(56) References Cited

U.S. PATENT DOCUMENTS 7,757,185 B2 * 7/2010 Paquette ............... G06F 3/0238
                                                     345/168
9,235,329 B2 * 1/2016 Nicholas, III .......... G06F 21/31
(Continued)

Primary Examiner — Shantell L Heiber
(74) Attorney, Agent, or Firm — Haynes and Boone, LLP

(57) ABSTRACT

Various systems, mediums, and methods may involve a provider application configured to access a user account associated with a provider server. For example, a system may perform operations to identify one or more other applications installed on the mobile device that may be configured to communicate with the provider server. The system may determine data required by the other applications to perform one or more data transfers with the user account. The system may cause the provider application to send the data required to the other applications. As such, the other applications may be enabled to perform one or more data transfers with the user account based on the data sent to the other applications.

20 Claims, 12 Drawing Sheets

Related U.S. Application Data continuation of application No. 15/162,845, filed on May 24, 2016, now Pat. No. 9,883,319.

(51) Int. Cl.
  *G06Q 20/32* (2012.01)
  *G06Q 20/36* (2012.01)
  *G06Q 20/10* (2012.01)
  *H04W 88/02* (2009.01)

(56) References Cited

U.S. PATENT DOCUMENTS

| | | | | |
|---|---|---|---|---|
| 2007/0027820 | A1* | 2/2007 | Elharar | G06Q 20/12 |
| | | | | 705/76 |
| 2007/0282757 | A1* | 12/2007 | Pandya | G06Q 20/3821 |
| | | | | 705/76 |
| 2013/0262309 | A1* | 10/2013 | Gadotti | G06Q 20/3276 |
| | | | | 705/44 |
| 2014/0195926 | A1* | 7/2014 | Hussain | G06F 3/0488 |
| | | | | 715/750 |
| 2016/0315985 | A1* | 10/2016 | Sarkic | G06Q 30/0601 |

* cited by examiner

MOBILE APPLICATION CONFIGURATIONS TO ENABLE DATA TRANSFERS

CROSS-REFERENCE TO RELATED APPLICATIONS

This application is a continuation of U.S. patent application Ser. No. 15/882,831, filed Jan. 29, 2018, issued as U.S. Pat. No. 10,595,192 on Mar. 17, 2020, which is a continuation of U.S. patent application Ser. No. 15/162,845, filed May 24, 2016, issued as U.S. Pat. No. 9,883,319 on Jan. 30, 2018, the contents of which are incorporated herein by reference.

BACKGROUND

A number of mobile applications may be installed on a mobile computing device. For example, consider a scenario where a user of a mobile device searches for a given application to install the application on the mobile device. Further, the user may select the application possibly from a number of other applications available from the search results. Based on a selection of the application, the mobile device may begin installing the application. Yet, possibly based on the particular application being installed, the application may require various forms of information from the user, such as credential information. In particular, the application may require the user's email address, username, password, phone number, home address, and/or other types of information to operate the application.

As demonstrated in the scenario above, there may be a number of steps simply to install a single application and operate the application. Thus, there may be various inconveniences and/or inefficiencies in practice associated with installing the application and operating the application. In addition, these inconveniences and/or inefficiencies may be proportionally increased based on the number of applications that the user may wish to install and/or operate. As provided above, there is much need for technological advancements in various aspects of computer technology in the realm of computer networks and particularly with mobile applications configured to more efficiently perform data transfers.

Figure 1:
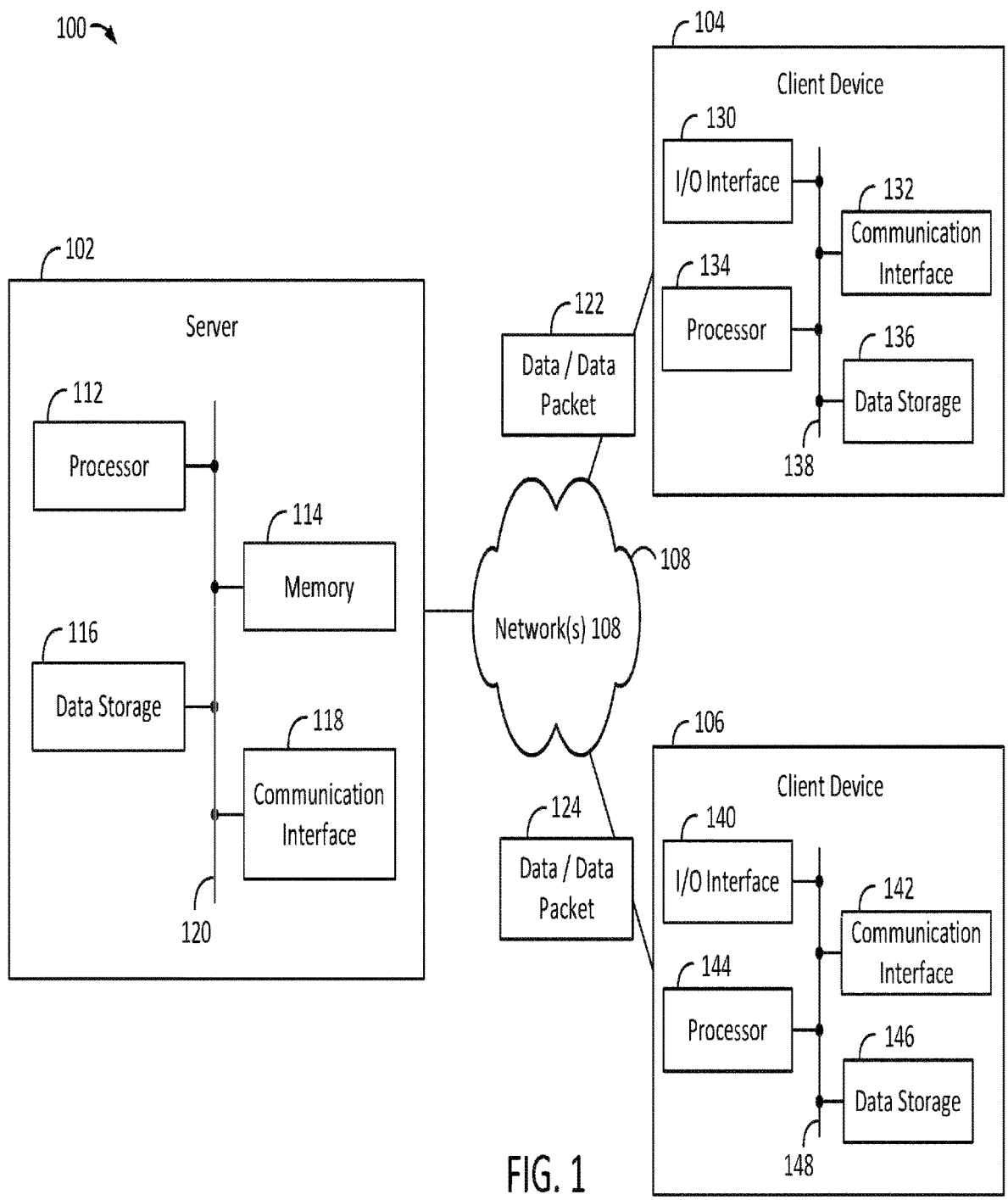
FIG. 1 is a block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described above, there may be various inconveniences and/or inefficiencies in practice associated with installing mobile applications and operating the applications. For example, consider the scenarios described above, a user may be required to enter information for each application installed, such as an email address, a username, and/or a password, among other forms of credential information. Thus, having to enter such information for a number of applications downloaded may further accumulate such inconveniences.

In some embodiments, an application described herein may be a mobile application configured to alleviate the various inconveniences and/or inefficiencies described above and further herein. In some instances, the application may be configured to perform a number of data transfers for a user account with a given provider, such as PayPal, Inc. of San Jose, Calif., USA. For example, the application, possibly referred to as a provider app, a mobile provider app, and/or a provider application, may be configured to perform a fund transfer with the user account associated with the provider. Yet further, the provider application may be configured to identify one or more other applications on the mobile device configured to perform a fund transfer with the user account associated with the provider. In practice, the provider application may send a message and/or a notification to the other applications that indicates the user is authorizing the other applications to access the user account with the provider as a primary funding source for the other applications.

In some embodiments, the provider application may also be configured to identify data required by the other applications such that the other applications may be enabled to perform fund transfers with the user account with the provider. For example, referring to the scenarios above, the provider application may identify whether the other applications require the user's credential information, such as the user's email address, username, password, phone number, home address, and/or other types of information, such that the other applications may be installed on the mobile device. Further, the provider application may identify whether the other applications require such credential information to perform data transfers, e.g., fund transfers, with the user account associated with the provider. Further, the provider application may enable the other applications to perform data transfers with the user account. In some instances, the provider application may send, e.g., read and/or write, the data required to the other applications. Notably, the provider application may send various forms of data to each of the other applications, as each of the other applications may require different forms of data to perform the data transfers with the user account associated with the provider. As a result, when the user accesses and/or uses one of the other applications, no additional authentication input (such as entry of a password) is required from the user.

In some embodiments, the provider application may be activated with the other applications. For example, the provider application may be activated in response to a user input to the mobile device. As such, the other applications may be enabled to perform the data transfers, e.g., fund transfers, with the user account associated with the provider. In some instances, the provider application may display a respective icon for each of the other applications on a graphical user interface of the mobile device. Further, the provider application may display a respective enable button for each of the other applications. As such, the provider application may be configured to enable the other applications to perform the data transfers with the user account associated with the provider, possibly based on user inputs received with the respective enable buttons. Yet further, the provider application may display respective toggle buttons for each of the other applications on the graphical user interface. As such, the provider application may be configured to enable the other applications to perform the data transfers or disable the other application from performing the data transfers, possibly based on user inputs received with the respective toggle buttons.

In practice, consider a scenario where the other applications may include a food application, a hotel application, a rental application, and/or a taxi application, among other types of applications. As such, the provider application may enable these other applications to access the user account with the provider, particularly enabling the other applications to perform data transfers, e.g., fund transfers, with the user account. For example, the food application may be enabled to generate food orders with funds from the user account, the hotel application may enabled to generate hotel reservations with funds from the user account, the rental application may be enabled to generate rental reservations with funds from the user account, and the taxi application may be enabled to generate taxi reservations with fund from the user account, among other possibilities with additional applications as well, where the payment is automatically defaulted to the payment provider and/or the user does not need to separately authenticate through those applications.

FIG. 1 is a simplified block diagram of an exemplary system 100, according to an embodiment. As shown, the system 100 may include a server 102. The server 102 may be configured to perform operations of a provider, such as PayPal, Inc. of San Jose, Calif., USA. Further, the system 100 may also include client device 104 and the client device 106. As such, the server 102 and the client devices 104 and 106 may be configured to communicate over the one or more communication networks 108. As shown, the system 100 includes multiple computing devices 102, 104, and/or 106.

The system 100 may operate with more or less than the computing devices 102, 104, and/or 106 shown in FIG. 1, where each device may be configured to communicate over the one or more communication networks 108, possibly to transfer data accordingly. The one or more communication networks 108 may include a packet-switched network configured to provide digital networking communications and/or exchange data of various forms, content, type, and/or structure. In some instances, the one or more communication networks 108 may include a data network, a private network, a local area network, a wide area network, a telecommunications network, and/or a cellular network, among other possible networks. In some instances, the communication network 108 may include network nodes, web servers, switches, routers, base stations, microcells, and/or various buffers/queues to transfer data/data packets 122 and/or 124.

The data/data packets 122 and/or 124 may include the various forms of data associated with the user accounts described herein. The data/data packets 122 and/or 124 may be transferrable using communication protocols such as packet layer protocols, packet ensemble layer protocols, and/or network layer protocols, among other types of communication protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying capacities, such as capacities varying from 1,000 to 1,100 bytes, for example, among other possible data capacities. As such, data/data packets 122 and/or 124 may be transferrable over the one or more networks 108 and to various locations in the one or more networks 108.

In some embodiments, the server 102 may take a variety of forms. The server 102 may be an enterprise server, possibly operable with one or more operating systems to facilitate the scalability of the architecture within the system 100. For example, the server 102 may operate with a Unix-based operating system configured to integrate with a growing number of other servers in the one or more networks 108, the client devices 104 and/or 106, among other computing devices configured to communicate with the system 100. The server 102 may further facilitate workloads associated with numerous data transfers in view of an increasing number of applications on the client devices 104 and/or 106. In particular, the server 102 may facilitate the scalability relative to such increasing number of data transfers to eliminate data congestion, bottlenecks, and/or transfer delays.

In some embodiments, the server 102 may include multiple components, such as one or more hardware processors 112, non-transitory memories 114, non-transitory data storages 116, and/or communication interfaces 118, among other possible components described in relation to FIG. 1, any of which may be communicatively linked via a system bus, network, or other connection mechanism 120. The one or more hardware processors 112 may take the form of a multi-purpose processor, a microprocessor, a special purpose processor, a digital signal processor (DSP) and/or other types of processing components. For example, the one or more hardware processors 112 may include an application specific integrated circuit (ASIC), a programmable system-on-chip (SOC), and/or a field-programmable gate array (FPGA). In particular, the one or more hardware processors 112 may include a variable-bit (e.g., 64-bit) processor architecture configured to transfer the data packets 122 and/or 124. As such, the one or more hardware processors 112 may execute varying instructions sets (e.g., simplified and complex instructions sets) with fewer cycles per instruction than other general-purpose hardware processors, thereby improving the performance of the server 102.

In practice, for example, the one or more hardware processors 112 may be configured to read instructions from the non-transitory memory component 114 to cause the system 100 to perform operations. For example, the system 100 may cause a provider application on the client device 104 to identify one or more other applications on the client device 104 configured to communicate with the provider server 102. The system 100 may determine data required by the other applications such that the other applications may perform data transfers with the user account. Further, the system 100 may also cause the provider application to send the data required to the other applications. Yet further, the system 100 may also enable the one or more other applications to perform the one or more data transfers based on the data required sent to the one or more other applications.

The non-transitory memory component 114 and/or the non-transitory data storage 116 may include one or more volatile, non-volatile, and/or replaceable storage components, such as magnetic, optical, and/or flash storage that may be integrated in whole or in part with the one or more hardware processors 112. Further, the memory component 114 may include or take the form of a non-transitory computer-readable storage medium, having stored thereon computer-readable instructions that, when executed by the hardware processing component 112, cause the server 102 to perform operations described in this disclosure, illustrated by the accompanying figures, and/or otherwise contemplated herein.

The communication interface component 118 may take a variety of forms and may be configured to allow the server 102 to communicate with one or more devices, such as the client devices 104 and/or 106. For example, the communication interface 118 may include a transceiver that enables the server 102 to communicate with the client devices 104 and/or 106 over the one or more communication networks 108. In some instances, the communication interface 118 may include a wired interface, such as an Ethernet interface, to communicate with the client devices 104 and/or 106. Further, in some instances, the communication interface 118 may include a cellular interface, such as a Global System for Mobile Communications (GSM) interface, a Code Division Multiple Access (CDMA) interface, and/or a Time Division Multiple Access (TDMA) interface. Yet further, in some instances, the communication interface 118 may include a wireless local area network interface such as a WI-FI interface configured to communicate with a number of different protocols. As such, the communication interface 118 may include a wireless interface operable to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. In particular, the client devices 104 and 106 may be configured to transfer data packets 122 and/or 124 associated with a user account to and from the server 102. The data packets 122 and/or 124 may also include location data such as Global Positioning System (GPS) data or GPS coordinate data, triangulation data, beacon data, WI-FI data, sensor data, movement data, and/or temperature data, among other types of data.

In some embodiments, the client devices 104 and 106 may include or take the form of a smartphone system, a personal computer (PC) such as a laptop device, a tablet computer device, a wearable computer device, a head-mountable display (HMD) device, a smart watch device, and/or other types of computing devices configured to transfer data associated with a user account. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to users of the client devices 104 and 106. For example, the I/O interface 130 may include a graphical user interface (GUI) configured to receive a user input that activates the provider application with the other applications. Thus, the I/O interfaces 130 and 140 may include displays and/or input hardware with tangible surfaces such as touchscreens with touch sensors and/or proximity sensors configured with variable sensitivities to detect the user touch inputs. The I/O interfaces 130 and 140 may also be synched with a microphone, sound speakers, and/or other audio mechanisms configured to receive voice commands. Further, the I/O interfaces 130 and 140 may also include a computer mouse, a keyboard, and/or other interface mechanisms. In addition, I/O interfaces 130 and 140 may include output hardware, such as one or more touchscreen displays, haptic feedback systems, and/or other hardware components.

In some embodiments, communication interfaces 132 and 142 may take a variety of forms. For example, communication interfaces 132 and 142 may be configured to allow client devices 104 and 106, respectively, to communicate with one or more devices according to a number of protocols described or contemplated herein. For instance, communication interfaces 132 and 142 may be configured to allow client devices 104 and 106, respectively, to communicate with the server 102 via the one or more communication networks 108. The processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure, illustrated by the accompanying figures, and/or otherwise contemplated herein.

In some embodiments, the client device 104 may include a provider application that enables other applications of the client device 104 to perform data and/or fund transfers with the user account. For example, the data and/or fund transfers may be encoded in the data packet 122 to establish a connection with the server 102. As such, the data packet 122 may initiate a search of an internet protocol (IP) address of the server 102 that may take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the server 102 may complete the transfer, possibly based on the data packet 122.

It can be appreciated that the server 102 and the client devices 104 and/or 106 may be deployed in various other ways. For example, the operations performed by the server 102 and/or the client devices 104 and 106 may be performed by a greater or a fewer number of devices. Further, the operations performed by two or more of the devices 102, 104, and/or 106 may be combined and performed by a single device. Yet further, the operations performed by a single device may be separated or distributed among the server 102 and the client devices 104 and/or 106. In addition, the client devices 104 and/or 106 may be operated and/or maintained by different users such that each client device 104 and/or 106 may be associated with one or more respective user accounts.

Notably, a user account associated with a provider may be displayed on the client device 104, possibly with the I/O interface 130. For example, a provider application of the client device 104 may be configured to access the user account displayed on the I/O interface 130. In some instances, the user account may be a personal account with funds. Further, the user account may be a corporate account, such that employees, staff, worker personnel, and/or contractors, among other individuals may have access to the corporate account. Further, an account may be a family account created for multiple family members, where each member may have access to the account. Yet further, it should be noted that a user may be a number of individuals, a group, and/or possibly a robot, a robotic device, and/or a robotic system, among other computing devices capable of transferring data associated with the user account. In some instances, data may be required to access the user account and/or perform a transfer with the account. For example, the data required may include credential information, such as a login, an email address, a username, a password, a phone number, a security code, an encryption key, authentication data, biometric data (e.g., fingerprint data), and/or other types of data to access the user account and/or perform a transfer with the account.

Figure 2A:
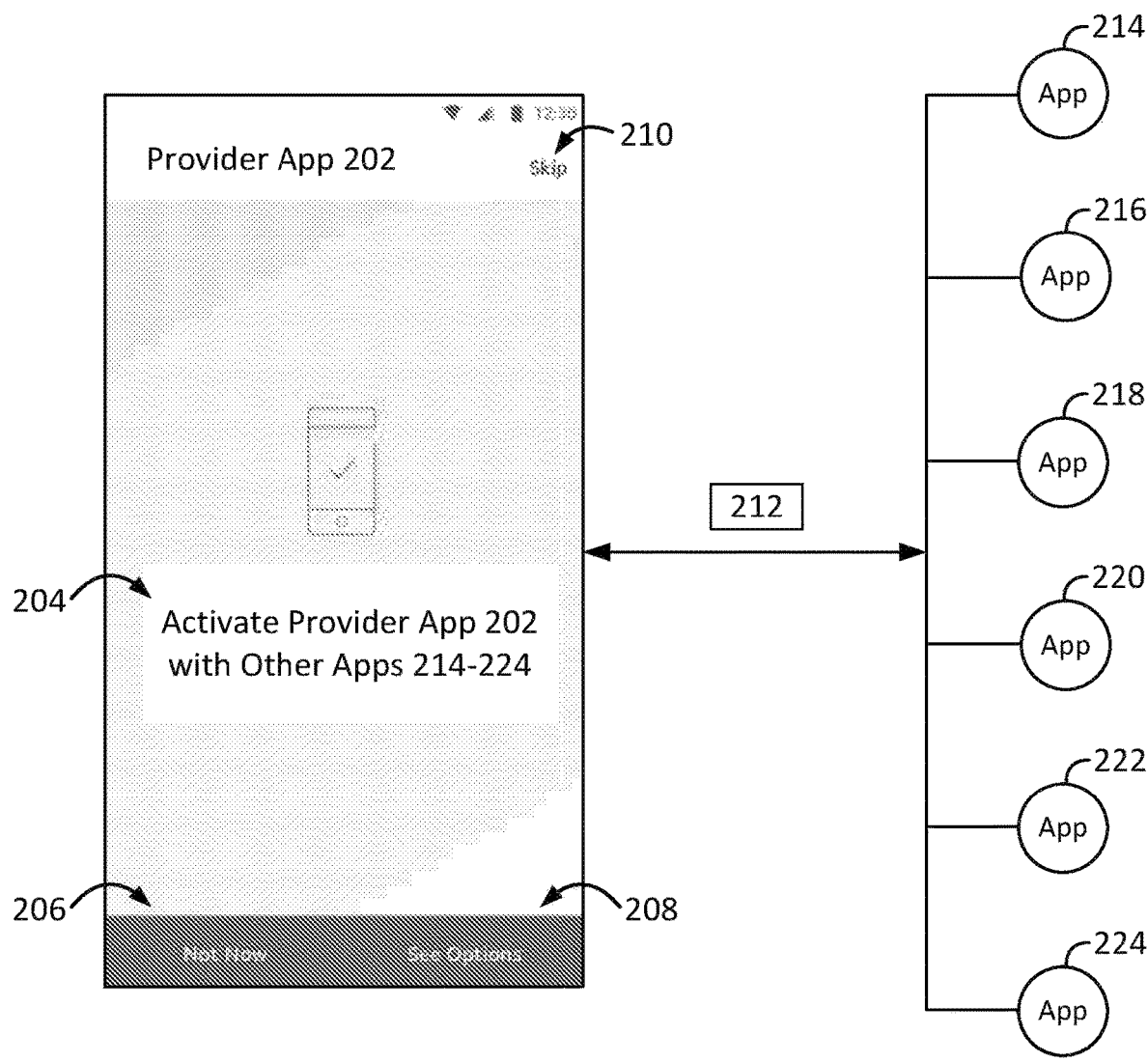
FIG. 2A illustrates an exemplary system with a provider application, according to an embodiment.

FIG. 2A illustrates an exemplary system 200 with a provider application 202, according to an embodiment. As shown, the provider application 202 may be displayed on a computing device, such as the client device 104 described above in relation to FIG. 1, possibly with the I/O interface 130. The provider application 202 may be configured to access a user account with a provider, such as PayPal, Inc. of San Jose, Calif., USA.

Further, as illustrated, the provider application 202 may include an input location 204 that indicates, "Activate Provider App 202 with Other Apps 214-224." As such, by selecting the input location 204, the provider application 202 may identify the other applications 214-224 configured to communicate and/or perform data transfers with a provider server, such as the provider server 102. The other applications 214-224 may be determined by the provider, such as by determining which entities, merchant entities, and/or merchants associated with those other applications 214-224 are configured and/or authorized to receive funds from the provider. For example, the other applications 214-224 may be determined with a search of a database or memory storing such information, such as the data storage 116 of the provider server 102. As noted, the data transfers with the provider server 102 described above may include a fund transfer from the user account maintained by the provider server 102. As such, the applications 214-224 may be identified based on the applications 214-224 being configured to perform the fund transfer with the user account with the provider. In particular, the applications 214-224 may be associated with respective entities, merchant entities, and/or merchants that accept fund transfers from user accounts with the provider. Notably, the applications 214-224 may include a subset of all the applications installed and/or downloaded by the mobile system 200.

In addition, by selecting the input location 206 that indicates, "Not Now," the provider application 202 may decline the option to activate the provider application 202 with the other applications 214-222. Further, by selecting the input location 208 that indicates, "Set Options," the provider application 202 may provide an option menu that may provide various options with the provider application 202 requesting the user to activate the provider application 202 with the other applications 214-224. Yet further, by selecting the input location 210 that indicates, "Skip," the provider application 202 may jump and/or skip forward to a transfer menu to provide various options to make data transfers without activating the provider application 202 with the other applications 214-224.

In some embodiments, the data 212 required by the other applications 214-224 may be determined. For example, by selecting the input location 204, the data 212 required by the other applications 214-224 may be determined such that the applications 214-224 may perform one or more data transfers with the user account. In some instances, the provider application 212 may send the data required 212 to the other applications 214-224. In such instances, the applications 214-224 may be enabled to perform the one or more data transfers with the user account associated with the provider and/or the provider server 102.

In some embodiments, the data required 212 by the one or more other applications 214-224 to perform the one or more data transfers may include various types of data associated with the user account associated with the provider and/or the provider server 102. As such, the system 200 and/or the provider application 202 may determine the data 212 required by the one or more other applications 214-224 to perform data transfers with the user account includes an email address and/or a password. Notably, the user account may be accessed with the provider application 202 based on the email address and/or the password entered to and/or received from the provider application 202. Further, the system 200 may cause the provider application 202 to send the email address and/or the password to the one or more other applications 214-224. Yet further, the system 200 and/or the provider application 202 may enable the one or more other applications 214-224 to perform the one or more data transfers based on the email address and/or the password sent to the one or more other applications 214-224. In other embodiments, the other applications 214-224 may be authorized to pull or otherwise retrieve specific authorized information, such as from the provider application 202 or other storage areas associated with the provider (e.g., the data storage 116 of the provider server 102), possibly for authorizing the one or more other applications 214-224 to transfer funds with the user account for a transaction associated with the one or more other applications 214-224.

Figure 2B:
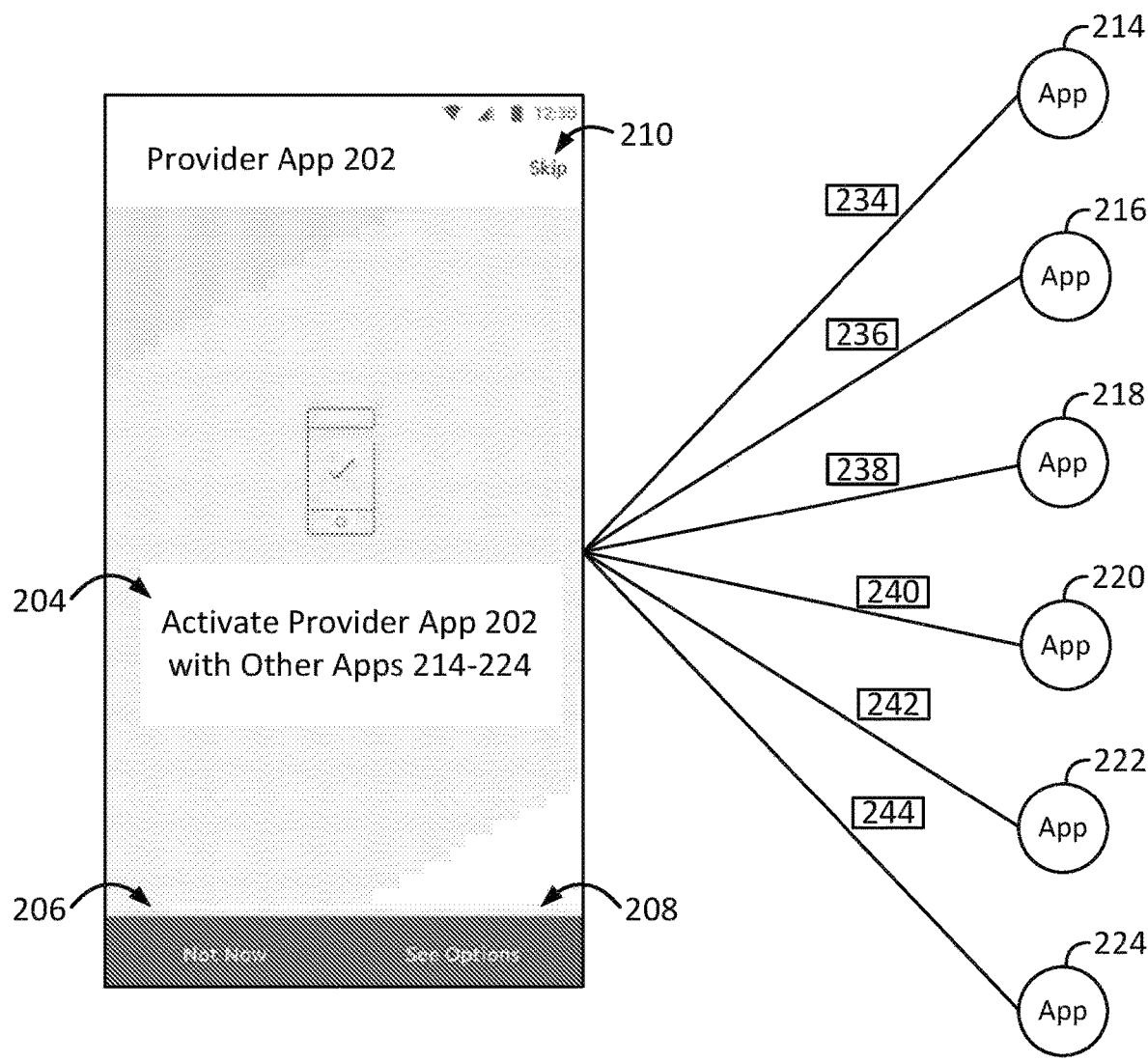
FIG. 2B illustrates an exemplary system with a provider application configured to transfer data, according to an embodiment.

FIG. 2B illustrates the exemplary system 200 with the provider application 202 configured to transfer data 234-244, according to an embodiment. The exemplary system 200, possibly referred to as the mobile system 200, may include various components and/or aspects of the system 100 described above in relation to FIG. 1. As shown, the provider application 202 may include the input locations 206, 208, and 210 described above in relation to FIG. 2A. As noted above, the provider application 202 may identify the other applications 214-224 configured to communicate with the provider server 102 described above. As described, the provider application 202 may be activated with the other applications 214-224, possibly based on an input received by the mobile system 200. For example, by selecting the input location 204, the other applications 214-224 may be enabled to perform one or more data transfers with the user account.

In some embodiments, the data 234-244 may be required by the applications 214-224 to perform the one or more data transfers with the user account. Thus, in some instances, the data 234-244 required may be determined and/or identified by the mobile system 200. In some instances, the data 234-244 required may be determined and/or identified by the provider application 202. For example, by selecting the input location 204, the mobile system 200 and/or the provider application 202 may determine data 234-244 required by the applications 214-224 such that the applications 214-224 may be enabled to perform one or more data transfers with the user account. As shown, the data 234, 236, 238, 240, 242, and 244 may be required by the applications 214, 216, 218, 220, 222, and 224, respectively.

In some embodiments, the respective data 234, 236, 238, 240, 242, and 244 required by the corresponding applications 214, 216, 218, 220, 222, and 224 may be determined to enable each of the applications 214, 216, 218, 220, 222, and 224 to perform one or more corresponding data transfers with the user account and/or using the user account. In some instances, the data 234-244 may include the same or different forms of data, particularly based on the respective applications 214, 216, 218, 220, 222, and 224, and/or the respective requirements of each of the applications 214-224. In such instances, the mobile system 200 may cause the provider application 202 to send the respective data 234, 236, 238, 240, 242, and 244 required to each of the one or more other applications 214, 216, 218, 220, 222, and 224. Further, each of the one or more other applications 214, 216, 218, 220, 222, and 224 may be enabled to perform corresponding data transfers with the user account based on the respective data 234, 236, 238, 240, 242, and 244 sent to each of the other corresponding applications 214, 216, 218, 220, 222, and 224.

For example, the application 214 may require data 234 including an email address and a password to perform data transfers with the user account. The application 216 may require data 236 including a phone number, an email address, a username, and a password to perform data transfers with the user account. The application 218 may require data 238 including an email address, a zip code, and a password to perform data transfers with the user account. The application 220 may require data 240 including an email address and a password to perform data transfers with the user account. The application 222 may require data 242 including a phone number, an email address, username, and a password to perform data transfers with the user account. The application 224 may require data 244 including an email address, a zip code, and a password to perform data transfers with the user account.

Figure 2C:
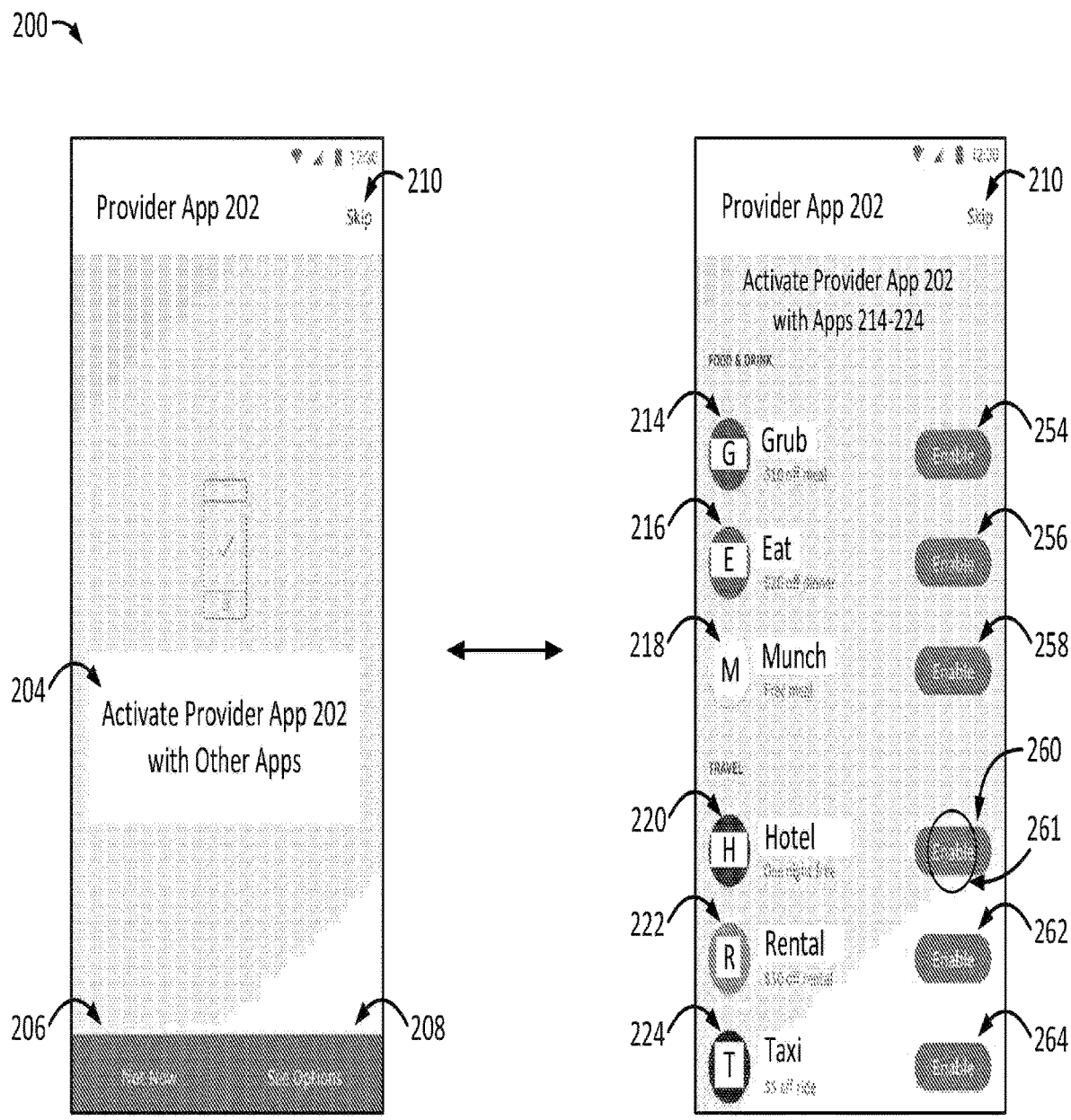
FIG. 2C illustrates the exemplary system with a provider application including the applications, according to an embodiment.

FIG. 2C illustrates the exemplary system 200 with the provider application 202 including the applications 214-224, according to an embodiment. As shown on the left side of FIG. 2C, an example embodiment of the provider application 202 includes the input locations 204, 206, 208, and 210 as described above in relation to FIGS. 2A-2B. For illustrative purposes, on the right side of FIG. 2C, another example embodiment of the provider application 202 includes the other applications 214-224 configured to communicate and/or perform data transfers with the provider. As noted, by selecting the input location 204, the provider application 202 may identify the applications 214-224 from a number of various other applications of the mobile system 200 and display the applications 214-224, as shown on the right side of FIG. 2C.

As shown, the applications 214, 216, and/or 218 may take the form of a food, drink, and/or a restaurant application, among other types of mobile applications. The application 220 may take the form of a hotel application, the application 222 may take the form of a rental application, and the application 224 may take the form of a taxi application. As such, the applications 214, 216, and/or 218 may be enabled to perform a data transfer that generates respective orders based on the data required 234, 236, and/or 238 sent to the applications 214, 216, and/or 218, respectively.

The hotel application 220 may be enabled to perform a data transfer that generates a hotel reservation based on the required data 240 sent to the hotel application 220. The rental application 222 may be enabled to perform a data transfer that generates a rental reservation based on the required data 242 sent to the rental application 222. The taxi application 224 may be enabled to perform a data transfer that generates the taxi reservation based on the required data 244 sent to the taxi application 224. The data transfers described above may be performed with the applications 214-224 and a provider server, such as the server 102 described above.

Further, in some instances, the applications 214-224 may be referred to as application icons 214-224. As shown, the provider application 202 may display respective application icons 214-224 for each of the other applications on a graphical user interface, such as the I/O interface 130 described above in relation to FIG. 1. In some instances, the provider application 202 may display respective enable buttons 254-264 for each of the applications 214-224 on the graphical user interface 130. As such, the applications 254-256 may be enabled to perform the one or more data transfers with the user account, possibly based on inputs received with the respective enable buttons 254-264.

By selecting the respective enable buttons 254-264, the applications 214-224 may be enabled to transfer funds from the user account with the provider to the respective entities, merchant entities, and/or merchants of the applications 214-224. In some instances, by selecting the respective enable buttons 254-264, the provider application 202 may determine the data required (e.g., login credentials, email addresses, usernames, and/or passwords) by the corresponding applications 214-224 to perform the data transfers with the user account. Further, the provider application 202 may send the respective data 234-244 to the corresponding applications 214-224 to enable the applications 214-224 to perform the data transfers with the user account. Notably, in various instances, the provider application 202 and the applications 214-224 may each be associated with different providers, entities, merchant entities, and/or merchants.

In some embodiments, a number of offers and/or deals may be associated with the enable buttons 254-264. For example, by selecting the enable button 254, the application 214 may provide a "$10 off meal" offer. Further, by selecting the enable button 256, the application 216 may provide a "$20 off dinner" offer. Yet further, by selecting the enable button 258, the application 218 may provide a "free meal" offer. In addition, by selecting the enable button 260, the application 220 may provide a "one night free" offer. Further, by selecting the enable button 262, the application 222 may provide a "$30 off rental" offer. Yet further, by selecting the enable button 264, the application 224 may provide a "$5 off ride" offer. Notably, such offers may be provided by the provider of the provider application 202 and/or the entities and/or merchants of the applications 214-224.

In some embodiments, referring back to FIGS. 2A-2C, the system 200 may determine the provider application 202 configured to access a user account associated with a provider server (e.g., the provider server 102). The mobile system 200 may identify one or more other applications 214-224 of the mobile system 200 configured to communicate with the provider server 102. In some instances, the one or more other applications 214-224 may be displayed by the mobile system 200. The mobile system 200 may receive a user selection 261 associated with the one or more other applications 214-224 displayed. In one particular example, the user selection 261 is associated with the selected application 220. Yet, various other applications 214-218, 222, and/or 224 may be selected as well. The mobile system 200 may determine data 240 required for the selected application 220 to perform one or more data transfers with the user account. As such, the mobile system 200 may cause the provider application 202 to send the data 240 required to the selected application 220. The mobile system 200 may enable the selected application 220 to perform the one or more data transfers with the user account based on the data 240 sent to the selected application 220.

In some embodiments, referring back to FIG. 2C, the mobile system 200 may receive a user indication (e.g., an input to the input location 204) to activate the provider application 202 with the one or more other applications 214-224, such as the selected application 220. For example, the selected application 220 may be enabled to perform the one or more data transfers with the user account based on activating the provider application 202 with the selected application 220.

Figure 2D:
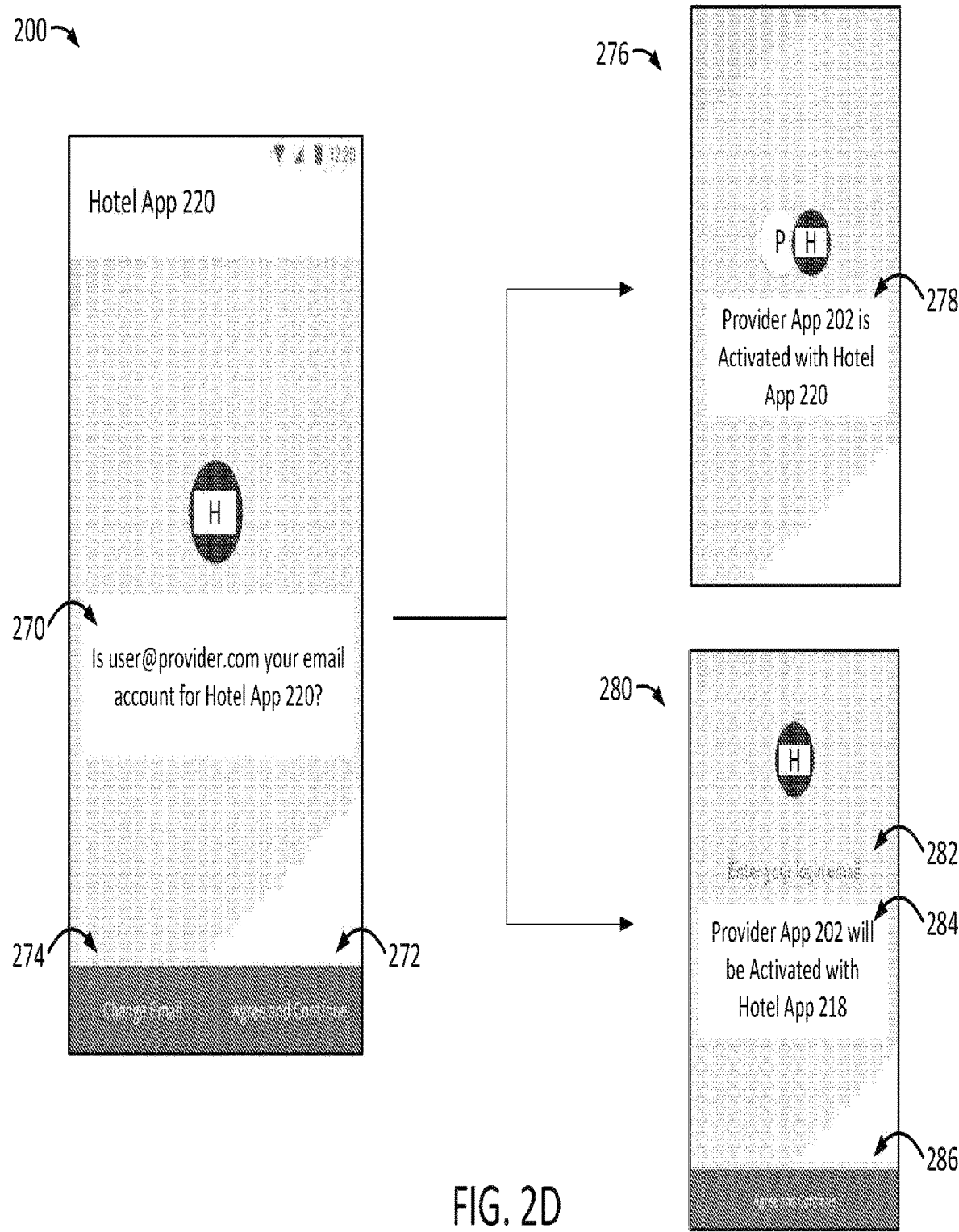
FIG. 2D illustrates the exemplary system with a given application, according to an embodiment.

FIG. 2D illustrates the exemplary system 200 with the application 220, according to an embodiment. As noted above, by selecting one or more of the enable buttons 254-264 shown in FIG. 2C, the corresponding applications 214-224 may be enabled to perform data transfers with the user account described herein. In some instances, the provider application 202 may be activated with the respective applications 214-224 based on the corresponding enable buttons 254-264 being selected. As such, the applications 214-224 may be enabled to perform fund transfers from the user account accessible by the provider application 202 without the user having to enter authentication credentials or otherwise authenticate the applications 214-224 and/or through the applications 214-224. Thus, funds may be transferred from the user account to the entities and/or merchants associated with the applications 214-224.

In addition, by selecting the one or more enable buttons 254-264, various other operations may be performed. For example, by selecting the enable button 260 shown in FIG. 2C, the hotel application 220 may be generated by the graphical user interface of the mobile system 200, possibly an interface that takes the form of the I/O interface 130. As shown, the hotel application 220 may provide a notification 270 that indicates, "Is user@provider.com your email account for Hotel App 220?" It should be noted that the email address, "user@provider.com," may be the email address associated, represented, and/or stored with the provider application 202 and/or the provider server 102. Thus, various input locations 272 and 274 may be selected, possibly to activate the provider application 202 with the hotel application 220 such that the hotel application 220 may be enabled to make data transfers with the user account associated and/or maintained with the provider server 102. As shown, the input location 272 indicates "Agree and Continue" and the input location 274 indicates "Change Email."

For example, by selecting the input location 272, the hotel application 220 may provide the interface 276. As shown, the interface 276 includes a notification 278 that indicates, "Provider App 202 is Activated with Hotel App 220," possibly where the email address, "user@provider.com," is the email address associated, represented, and/or stored with the hotel application 202. As such, the hotel application 220 may be enabled to make data transfers with the user account of the provider application 202 associated and/or maintained with the provider server 102. It should be noted that allowing the user to select the input location 272 may eliminate the user from having to manually enter an email address for the hotel application 220, thereby alleviating the inconveniences and/or inefficiencies described above with installing mobile applications.

Further, by selecting the input location 274, one or more other emails may be entered with the hotel application 220. As shown, the interface 280 includes an input location 282 that indicates, "Enter your login email," possibly where a user may enter their login email for the hotel application 220. For example, in a scenario where a user may already have existing credential information (e.g., an email and a password) with the hotel application 220, the user may enter an existing email address and also activate the provider application 202 with the hotel application 220. Notably, by selecting the input location 282, a keyboard may be generated with the hotel application 220, where the existing email address and/or password may be entered. Further, a notification 284 may indicate, "Provider App 202 will be Activated with Hotel App 218," possibly based on the existing email address and/or password entered. As such, the hotel application 220 may be enabled to make data transfers with the user account of the provider application 202 associated and/or maintained with the provider server 102, by selecting the input location 286.

Figure 3A:
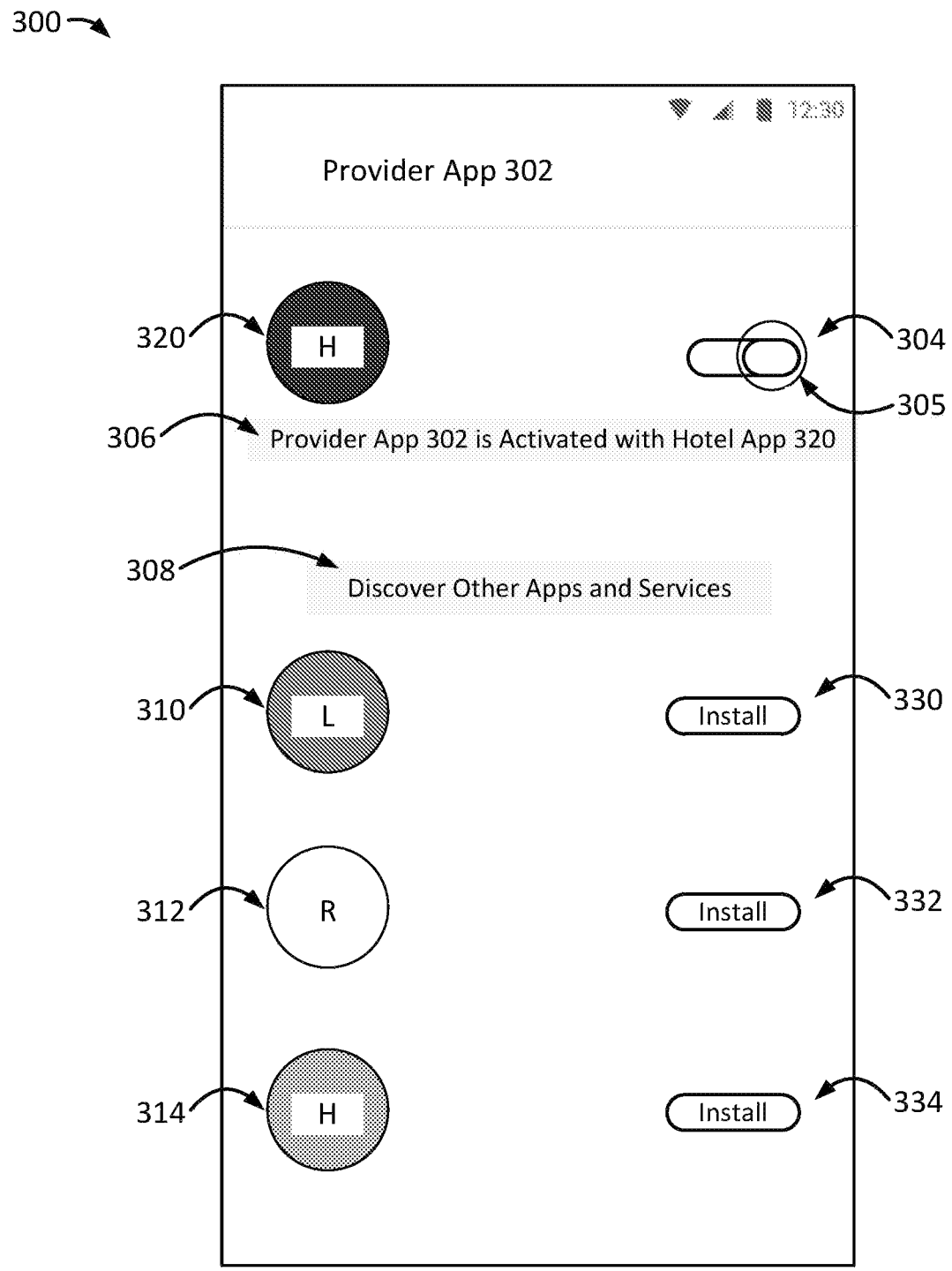
FIG. 3A illustrates an exemplary system with a number of installable applications, according to an embodiment.

FIG. 3A illustrates the exemplary system 300 with a number of installable applications, according to an embodiment. The system 300 may include components and/or aspects of the systems 100 and/or 200 described above in relation to FIGS. 1-2D. For example, the provider 302 may take the form of the provider application 202 described above. The hotel application 320 may take the form of the hotel application 220 described above. As shown, a notification 306 may indicate, "Provider App 302 is Activated with Hotel App 320," thereby enabling the hotel application 220 to make data transfers and/or fund transfers with the user account of the provider application 302 associated and/or maintained with the provider server 102.

Further, as shown, the provider application 302 may display a toggle button 304 that corresponds to the hotel application 320. As such, the provider application 320 may be enabled to perform data transfers, such as fund transfers with the user account of the provider application 302 described above, possibly based on a user input received with the toggle button 304. In particular, by moving the toggle button 304 to the right as shown, the notification 306 may indicate, "Provider App 302 is Activated with Hotel App 320." As such, the hotel application 220 may be enabled to make data and/or fund transfers with the user account of the provider application 302. Further, by moving the toggle button 304 to the left, the notification 306 may indicate, "Provider App 302 is Deactivated from Hotel App 320." As such, the hotel application 320 may be disabled from performing data and/or fund transfers with the user account of the provider application 302.

As shown, the provider application 302 may also provide a notification 308 that indicates, "Discover Other Apps and Services." Further, the provider application 302 may provide a number of installable applications 310, 312, and 314. For example, the application 310 may be a travel application configured to perform data transfers to match drivers and passengers, such that the passengers can identify and select from multiple drivers to travel to a given destination. The application 312 may be a reservation application configured to perform data transfers that enable users to make reservations at restaurants and perform fund transfers accordingly to cover their meals. The application 314 may be an audiobook application configured to perform data transfers that operate listening devices, such as the client devices 104 and/or 106 described above.

As shown, the provider application 302 may provider a number of install buttons 330, 332, and 334 that correspond to the installable applications 310, 312, and/or 314, respectively. Further, the one or more applications 310, 312, and/or 314 may be installed based on one or more inputs received with the respective install buttons 330, 332, and/or 334. By selecting one or more of the install buttons 330, 332, and/or 334, the corresponding applications 310, 312, and/or 314 may be installed on the mobile system 300. As such, the provider application 302 may provide the respective data (e.g., login credentials, email addresses, usernames, and/or passwords) to each of the applications 310, 312, and/or 314 to install each of the applications 310, 312, and/or 314. Further, the applications 310, 312, and/or 314 may be installed such that the applications 310, 312, and/or 314 may be configured to perform data and/or fund transfers, with the user account of the provider application 302. Notably, the applications 310, 312, and/or 314 may be installed without requiring the user to create and/or enter credential information for each of the applications 310, 312, and/or 314, thereby eliminating the inconveniences and/or the inefficiencies as described herein.

Figure 3B:
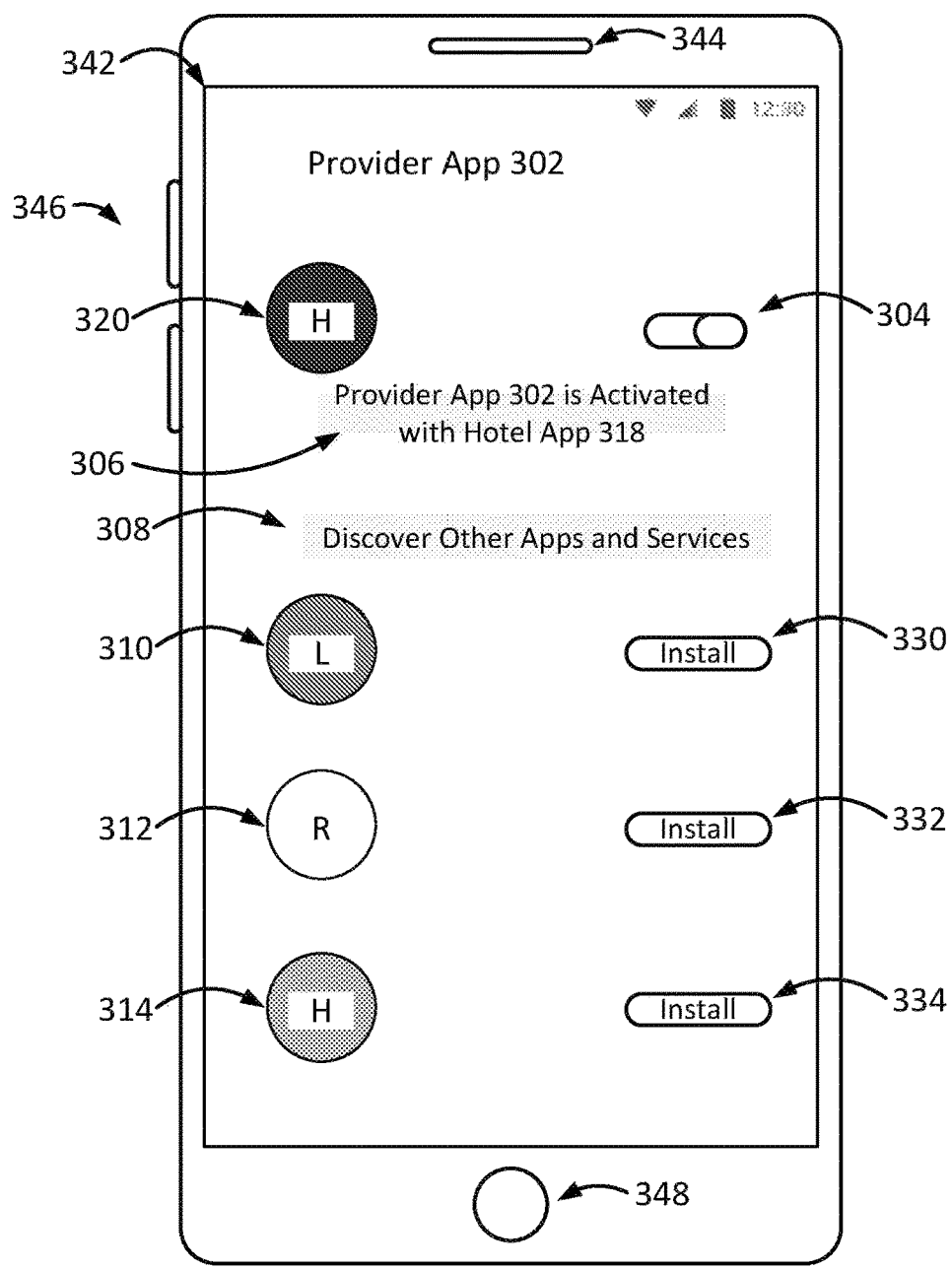
FIG. 3B illustrates an exemplary mobile system, according to an embodiment.

FIG. 3B illustrates the exemplary mobile system 300, according to an embodiment. As shown, the system 300 may take the form of a smartphone with an input/output (I/O) interface 342. Further, the I/O interface 342 may take the form of the I/O interface 130 described above, possibly referred to as a graphic display 342 with one or more touch sensors configured to detect touch inputs. Further, the I/O interface 342 may display the provider application 302, the hotel application 320, and the installable applications 310, 312, and/or 314, possibly among other applications described above in relation to FIGS. 2A-2D. Yet further, the I/O interface 342 may display the toggle button 304, the install buttons 330, 332, and/or 334, among possibly other buttons described above in relation to FIGS. 2A-2D.

Further, the mobile system 300 may include one or more side buttons 346 configured to adjust volumes associated with speakers and/or headsets coupled with the system 300. For example, the side buttons 346 may be configured to adjust the volume of the speaker 344, possibly playing one or more audiobooks associated with the application 314, as described above. Yet further, the mobile system 300 may include a button 348 with one or more touch sensors configured receive and/or detect a fingerprint of the user to perform the data and/or fund transfers described herein. As such, the one or more applications 310, 312, 314, and/or 320, among the other applications 202 and 214-224 described above, may be configured to perform data and/or fund transfers with the user account associated with the provider application 302, possibly based on the fingerprint of the user detected and/or received by the mobile system 300.

Figure 4A:
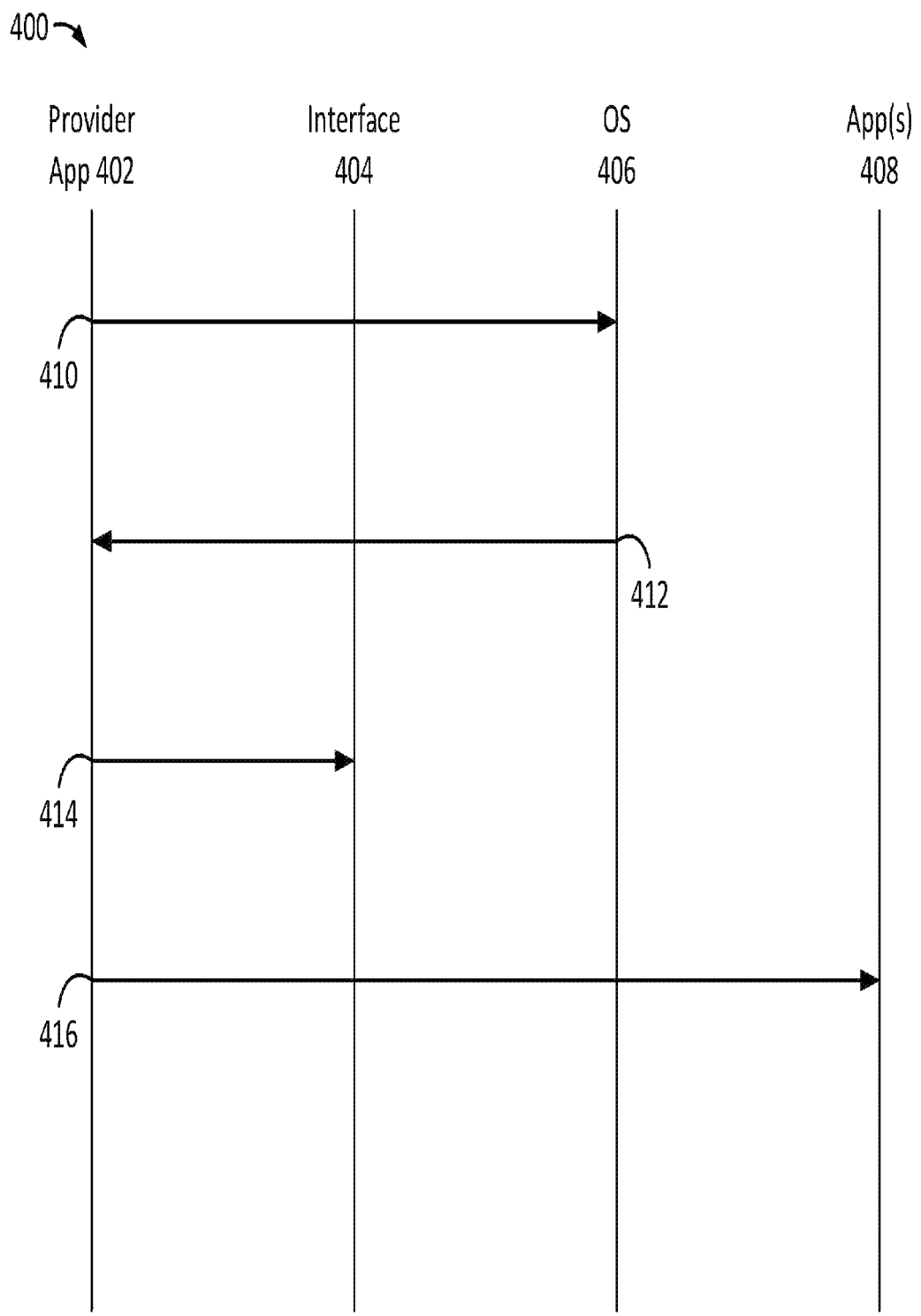
FIG. 4A illustrates an exemplary process chart, according to an embodiment.

FIG. 4A illustrates an exemplary process chart 400, according to an embodiment. As shown, the process chart 400 includes a provider application 402, an input/output (I/O) interface 404, an operating system (OS) 406, and one or more other applications 408. In some instances, the provider application 402 may take the form of the provider application 202 and/or the provider application 302 described above in relation to FIGS. 1-3B, among other provider applications described herein. Further, the I/O interface 404 may take the form of the I/O interfaces 130, 140, and/or 342 described above in relation to FIGS. 1-3B, among other I/O interfaces and/or graphical user interfaces described herein. Yet further, the operating system (OS) 406 may be an OS of the server 102, an OS of the client devices 104 and/or 106, an OS of the mobile system 200 and/or 300, among other operating systems of various devices and/or systems described herein. Further, the one or more other applications 408 may include the one or more other applications 214-224, the installable applications 310-314, among various other applications described herein. Thus, the various steps 410-416 may be carried out by the server 102 and/or the mobile system 200, among other systems and/or devices described herein.

At step 410, the provider application 402 of the mobile device 200 may be instructed to request an operating system (OS) 406 of the mobile device 200 to identify one or more other applications 214-224 of the mobile device 200 configured to perform one or more data transfers associated with the user account described above. For example, the provider application 402 may send a "Get Apps" call, possibly an application programming interface (API) call to the operating system 406, to identify the applications 214-224.

At step 412, in response to the request to the operating system (OS) 406 of the mobile device 200, application identification data may be retrieved from the operating system 406 that identifies the one or more other applications 214-224 of the mobile device 200 configured to perform the one or more data transfers associated with the user account. For example, considering the scenario above, based on the Get Apps call sent to the operating system 406, the application identification data may be retrieved from the operating system 406 to identify the applications 214-224, possibly from a list of other applications of the mobile device 200 as well.

At step 414, in response to retrieving the application identification data, the provider application 402 may be instructed to display one or more application icons 214-224 on an input/output interface 404, e.g., a graphic user interface 404. As noted, the one or more application icons 214-224 correspond with the one or more other applications 214-224 described herein. As such, referring back to FIG. 2C, the provider application 402 may be instructed display the one or more icons 214-224.

At step 416, the provider application 402 may be instructed to send data 234-244 to the one or more applications 408 that include the applications 214-224. The data 234-244 may be required by the one or more other applications 214-224 to perform the one or more data transfers associated with the user account. In particular, the one or more other applications 214-224 may be enabled to perform the one or more data transfers based on the data 234-244 sent from the provider application 402. As noted, the provider application 402 may send respective data 234, 236, 238, 240, 242, and/or 244 required by the corresponding applications 214, 216, 218, 220, 222, and/or 224 to enable the applications 214-224 to perform the data transfers associated with the user account.

In some embodiments, the data 234-244 sent to the one or more other applications 214-224 may include an email address and/or a password associated with the user account. For example, the provider application 402 may provide access to the user account based on the email address and/or the password. As such, the one or more applications 214-224 may be enabled to perform the one or more data transfers associated with the user account based on the email address and/or the password.

In some instances, referring back to FIG. 1, the non-transitory memory 114 of the server 102 may include a non-transitory machine-readable medium having stored thereon machine-readable instructions. The instructions may be executed to cause the server 102 to perform operations, such as the steps 410-416 in the process chart 400. For example, the server 102 may perform step 410 by causing the provider application 404 of the mobile device 200 to request the operating system (OS) 406 of the mobile device 200 to identify the one or more other applications 214-244 of the mobile device 200 configured to perform one or more data transfers associated with the user account.

Further, in response to the request to the operating system (OS) 406, the server 102 may perform step 412 by retrieving application identification data from the operating system 406 that identifies the one or more other applications 214-244 of the mobile device 200 configured to perform the one or more data transfers associated with the user account. In response to retrieving the application identification data, the server 102 may perform step 414 by causing the provider application 402 to display one or more application icons 214-244 on a graphic user interface 404 that correspond with the one or more other applications 214-244. Further, the server 102 may perform the step 416 causing the provider application 402 to send the data 234-244 required by the one or more other applications 214-224 to perform the one or more data transfers associated with the user account. In particular, the one or more other applications 214-224 may be enabled to perform the one or more data transfers based on the data 234-244 sent from the provider application 402.

Figure 4B:
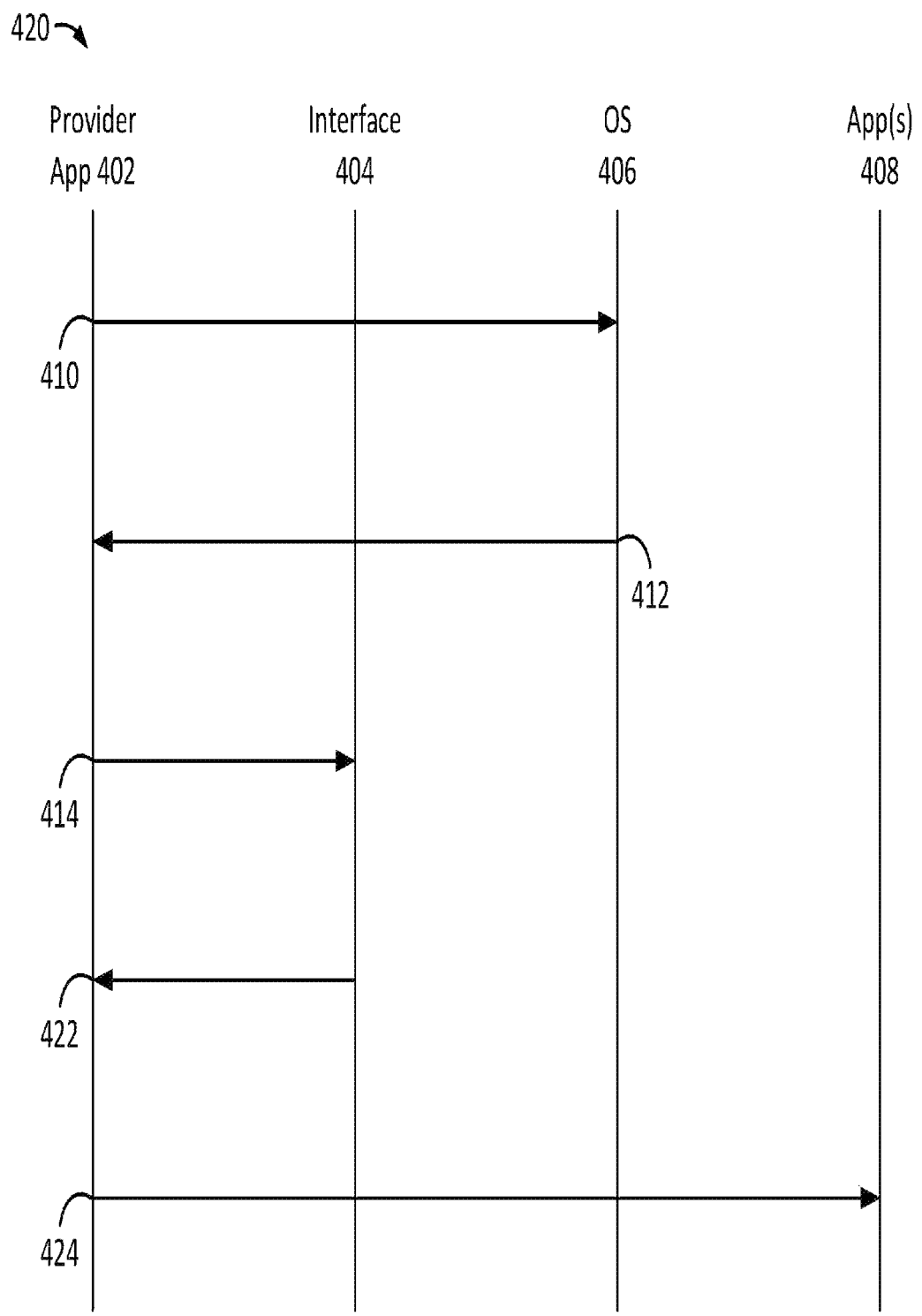
FIG. 4B illustrates an exemplary process chart with additional steps, according to an embodiment.

FIG. 4B illustrates an exemplary process chart 420 with additional steps 422 and 424, according to an embodiment. As shown, the process chart 420 includes the provider application 402, the I/O interface 404, the operating system (OS) 406, and/or the one or more applications 408 described above in relation to FIG. 4A. Further, the process chart 420 includes the steps 410-414 as described above in relation FIG. 4A. Thus, the various steps 410-414, 422, and 424 may be carried out by the server 102 and/or the mobile system 200, among other systems and/or devices described herein.

For example, at step 414, in response to retrieving the application identification data, the provider application 402 may be instructed to display one or more application icons 214-224 on an input/output interface 404, e.g., a graphic user interface 404. As noted, the one or more application icons 214-224 may correspond with the one or more other applications 214-224 described above. For example, referring back to FIG. 2C, the provider application 402 may be instructed to display the one or more icons 214-224 shown.

In some embodiments, the provider application 402 may be instructed to display respective enable buttons 254-264 for each of the corresponding applications 214-224 on the graphical user interface 404, as described above in relation to FIG. 2C. Further, in some instances, the provider application 402 may be instructed to display respective toggle buttons for each of the corresponding applications 214-224 on the graphical user interface 404. For example, referring back to FIGS. 3A-B, the toggle button 304 may be displayed for the corresponding application 320. Yet further, in some instances, the provider application 402 may be instructed to display one or more installable applications 310-314 on the graphical user interface 404. In addition, the provider application 402 may display respective install buttons 330-334 for each of the one or more installable applications 310-314 on the graphical user interface 404.

At step 422, the provider application 402 may receive one or more inputs detected by the graphical user interface 404. In some instances, the provider application 402 may receive the one or more inputs from the respective enable buttons 254-264, the respective toggle buttons, such as the toggle button 304, and/or the respective install buttons 330-334 described above.

At step 424, the provider application 402 may be instructed to send data 234-244 to the one or more applications 408, possibly including the one or more other applications 214-224. Further, the data 234-244 may be required by the one or more other applications 214-224 to perform the one or more data transfers associated with the user account. In particular, the one or more other applications 214-224 may be enabled to perform the one or more data transfers based on the data 234-244 sent from the provider application 402. As noted, the provider application 402 may send respective data 234, 236, 238, 240, 242, and/or 244 required by the corresponding applications 214, 216, 218, 220, 222, and/or 224 to enable the applications 214-224 to perform the data transfers associated with the user account. Notably, the provider application 402 may send the data 234-244 required by the one or more other applications 214-224 based on the one or more inputs received by the graphical user interface 404 described above in relation to step 422.

As noted, referring back to FIG. 1, the non-transitory memory 114 of the server 102 may include a non-transitory machine-readable medium having stored thereon machine-readable instructions. The instructions may be executed to cause the server 102 to perform operations. For example, the server 102 may cause the provider application 202 to display respective enable buttons 254-264 for each of the one or more other applications 214-224 on the graphical user interface 404. Further, the server 102 may enable the one or more applications 214-224 to perform the one or more data transfers based on one or more inputs received with the respective enable buttons 254-264.

In some embodiments, the server 102 may cause the provider application 302 to display respective toggle buttons, such as the toggle button 304 described above, for each of the one or more other applications, such as the application 320. For example, the selected application 320 may be enabled to accept the one or more data transfers based on the user selection 305 received with the respective toggle button 304. Notably, referring back to FIGS. 2A-2D, the one or more other applications 214-224, possibly the selected application 220 as shown, may be enabled to perform the one or more data transfers or disabled from performing the one or more data transfers based on one or more inputs received with the respective toggle buttons that correspond to the one or more other applications 214-224.

In some embodiments, referring to FIG. 3B, the server 102 may cause the provider application 302 to display one or more installable applications 310-314 on the graphical user interface 342. Further, the server 102 may cause the provider application 302 to display respective install buttons 330-332 for each of one or more installable applications 310-314 on the graphic user interface 342. Yet further, the one or more installable applications 310-314 may be installable based on one or more user inputs received with the respective install buttons 330-332 on the graphic user interface 342.

In some embodiments, the server 102 may cause at least one application from the one or more installable applications 310-314 to be installed based on the one or more inputs received with the respective install buttons 330-334. Further, the server 102 may cause the provider application 302 to transfer an email address and/or a password to the installed application 310, 312, and/or 314 to enable the installed application 310, 312, and/or 314 to perform the one or more data transfers associated with the user account.

Figure 5A:
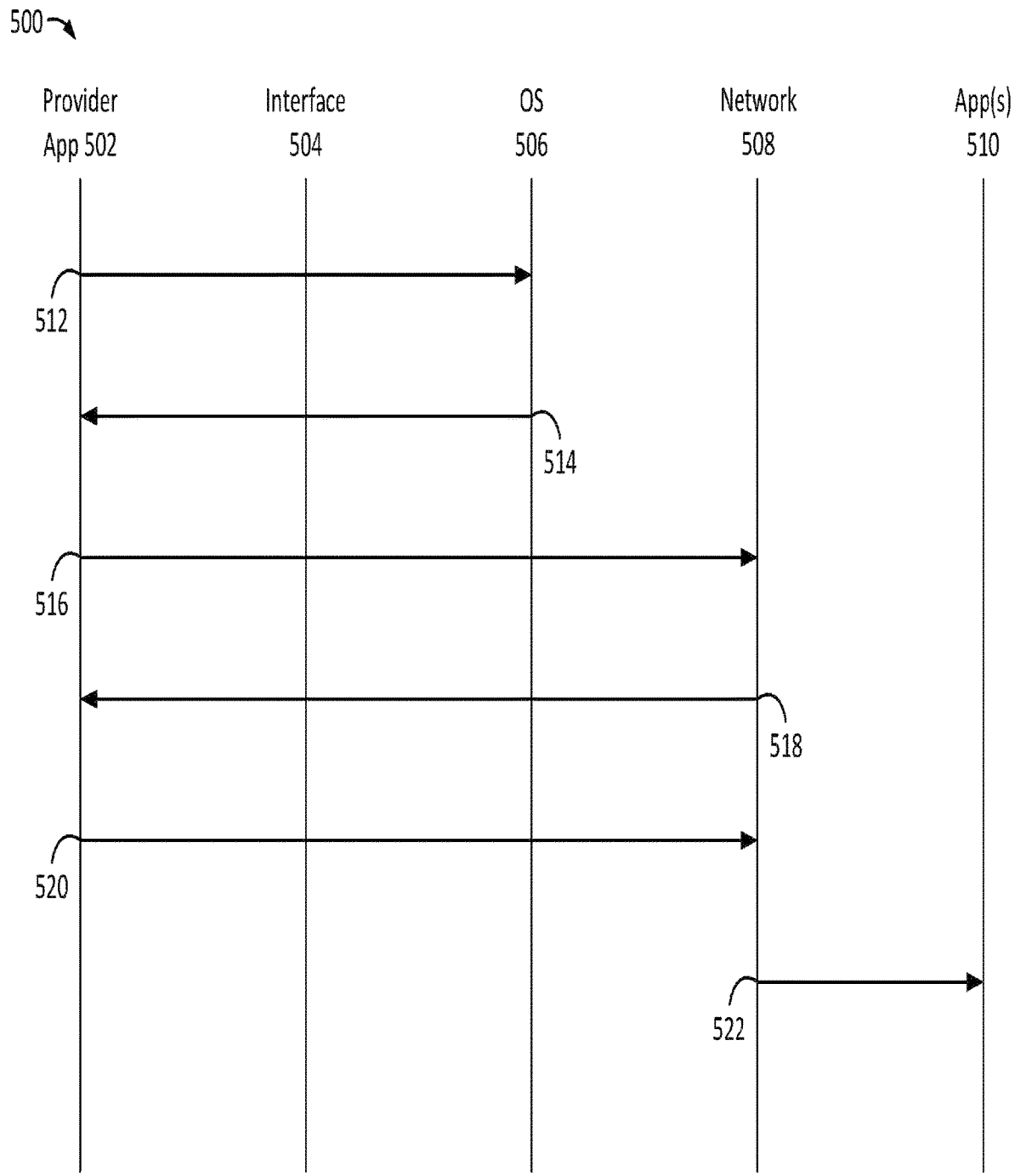
FIG. 5A illustrates an exemplary process chart, according to an embodiment.

FIG. 5A illustrates an exemplary process chart 500, according to an embodiment. As shown, the process chart 500 includes a provider application 502, an input/output (I/O) interface 504, an operating system (OS) 506, one or more networks 508, and one or more other applications 510. In some instances, the provider application 502 may take the form of the provider application 202, 302, and/or 402, among other applications described above in relation to FIGS. 1-4B. Further, the I/O interface 504 may take the form of the I/O interfaces 130, 140, 342, and/or 404, among other interfaces described above in relation to FIGS. 1-4B. Yet further, the operating system 506 may take the form of the operating system 406, possibly associated with the server 102, the client devices 104 and/or 106, the mobile system 200 and/or 300, among other devices and/or systems described herein.

In addition, the one or more networks 508 may take the form of the one or more networks 108 described above in relation to FIG. 1, among other networks described herein. For example, the one or more networks 508, possibly referred to as one or more provider networks 508, may be controlled, maintained, and/or owned by the provider of the server 102. In some instances, the one or more networks 508 may include an advertisement network, a social network, and/or an instant messaging network configured to identify the one or more applications 510, that may take the form of the applications 214-224 on the mobile system 200. In such instances, the process 500 may include the mobile system 200 generating an advertisement including an incentive based on a purchase made with the applications 214-224 and displaying the advertisement. For example, the mobile device 200 may communicate with the one or more networks 508 to generate the notification, "Activate Provider App 202 with Apps 214-224," and display icons that correspond to the applications 214-224, possibly also with the offers, "$10 off meal," "$20 off dinner," "free meal," "one night free," "$30 off rental," and/or "$5 off ride," among the other offers described herein. As contemplated herein, the various steps 512-522 may be carried out by the server 102 and/or the mobile system 200, among other systems and/or devices described herein.

At step 512, the provider application 502 of the mobile device 200 may be instructed to identify one or more other applications 214-224 of the mobile device 200 configured to communicate with a provider of the provider application 502. For example, the provider of the provider application 502 may take the form of the provider of the server 102 described above in relation to FIG. 1. As such, the provider application 502 may send a "Get Apps" call, possibly an application programming interface (API) call, to the operating system 506 to identify the applications 214-224.

At step 514, in response to the Get Apps call, the provider application 502 may retrieve application identification data from the operating system 506 that identifies the one or more applications 214-224 configured to communicate with the provider described above. In some embodiments, the application identification data described above indicates one or more installable applications 310-314 configured to perform the one or more data transfers with the provider. In such instances, referring back to FIG. 3B, the provider application 502 may take the form of the provider application 302. As such, the provider application 302 may display respective install buttons 330-334 for each of the one or more installable applications 310-314 on the graphical user interface 342 of the mobile device 300. As such, the one or more installable applications 310-314 may be configured to be installed based on one or more inputs received with the respective install buttons 330-334.

In some embodiments, the process 500 may include installing at least one application from the one or more installable applications 310-314 based on the one or more inputs received with the respective install buttons 330-334. Further, the process 500 may include causing the one or more networks 508 to send an email address and/or a password to the installed application 310-314 to enable the installed application 310-314 to perform the one or more data transfers with the user account.

At step 516, the provider application 502 may be instructed to communicate with the one or more networks 508 to retrieve network data associated with the one or more applications 214-224. As such, the provider application 502 may send a "Get Network Data" call, possibly an application programming interface (API) call, to the one or more networks 508 to retrieve the network data associated with the one or more applications 214-224.

At step 518, the provider application 502 may retrieve the network data associated with the one or more applications 214-224. Based on the network data retrieved, the provider application 502 may determine the data 234-244 required by the one or more applications 214-224 to perform one or more data transfers with a user account associated with the provider.

At step 520, the provider application 502 may be instructed to send the data 234-244 required to the one or more networks 508 to enable the one or more applications 214-224 to perform the one or more data transfers with the user account.

At step 522, the one or more networks 508 may send the data 234-244 to the one or more applications 510, possibly including the one or more applications 214-224. In some instances, the process 500 may include causing the one or more applications 214-224 to perform a fund transfer with the user account based on the data 234-244 sent to the one or more networks 508.

In some embodiments, the data 234-244 sent to the one or more networks 508 causes the one or more networks 508 to send an email address and/or a password to the one or more applications 214-224. Further, the one or more applications 214-224may be enabled to perform one or more data transfers with the user account based on the email address and/or the password sent to the one or more applications 214-224.

Figure 5B:
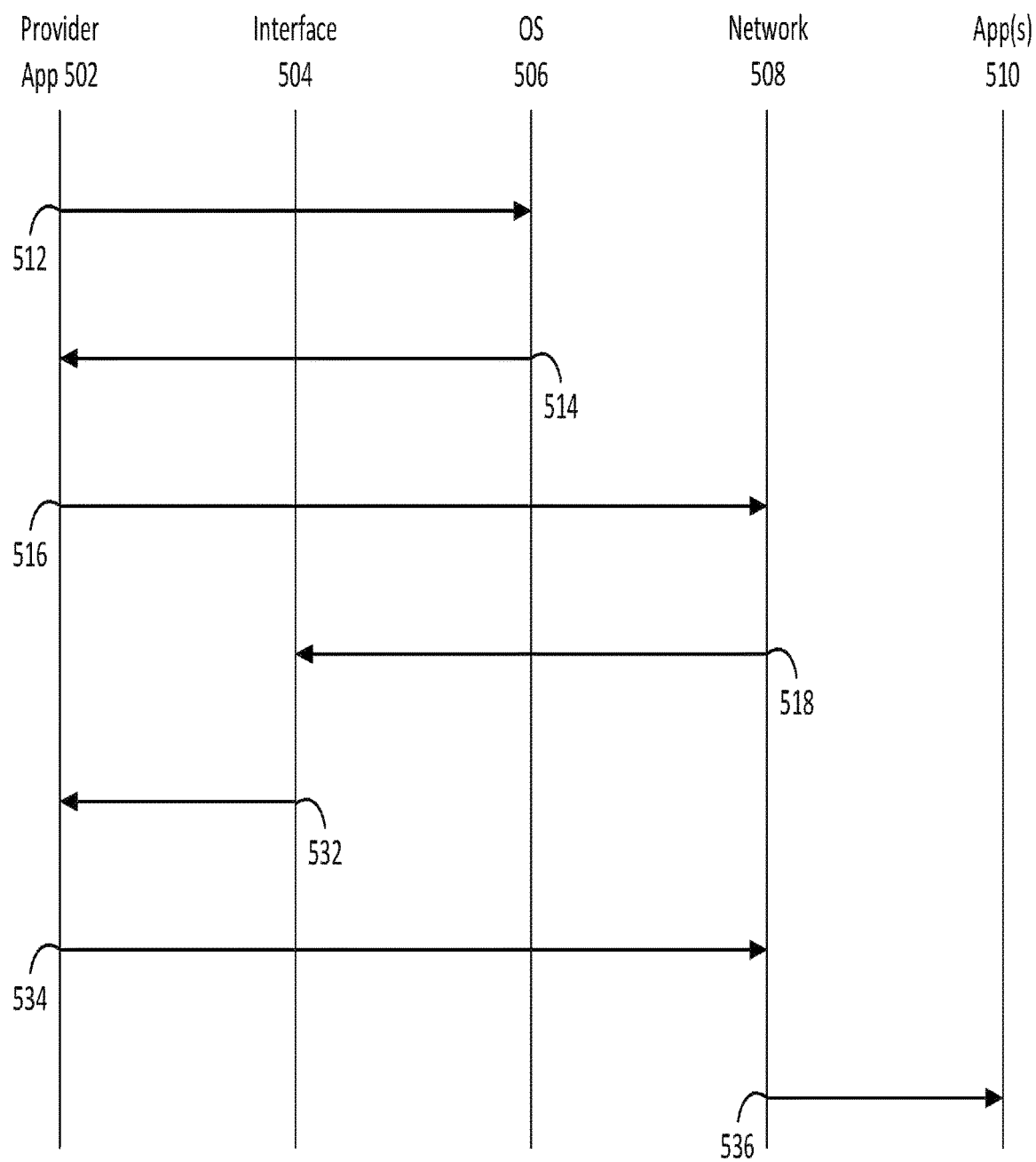
FIG. 5B illustrates an exemplary process chart with additional steps, according to an embodiment.

FIG. 5B illustrates an exemplary process chart 530 with additional steps 532, 534, and 536, according to an embodiment. As shown, the process chart 530 includes the provider application 502, the I/O interface 504, the operating system (OS) 506, the one or more networks 508, and/or the one or more applications 510 described above in relation to FIG. 5A. Further, the process chart 530 includes the steps 512-518 as described above in relation FIG. 5A. Thus, the various steps 512-518 and 532-536 may be carried out by the server 102 and/or the mobile system 200, among other systems and/or devices described herein.

As noted above, the provider application 502 may take the form of the provider application 202. As such, the provider application 502 may retrieve the network data associated with the one or more applications 214-224. Based on the network data retrieved, the provider application 502 may determine the data 234-244 required by the one or more applications 214-224 to perform one or more data transfers with a user account associated with the provider.

At step 518, the one or more icons may be displayed on the I/O interface 504, e.g., the graphical user interface 504, that correspond with the one or more other applications 214-224. For example, referring back to FIG. 2C, the provider application 402 may be instructed display the one or more icons shown that correspond to the one or more other application 214-224.

In some embodiments, the provider application 502 may be instructed to display respective enable buttons 254-264 for each of the corresponding applications 214-224 on the graphical user interface 504, as described above in relation to FIG. 2C. Further, in some instances, the provider application 502 may be instructed to display respective toggle buttons, such as the toggle button 304, for each of the corresponding applications 214-224 on the graphical user interface 504, as described above in relation to FIGS. 3A-B. Yet further, in some instances, the provider application 502 may be instructed to display one or more installable applications 310-314 on the graphical user interface 504.

At step 532, the provider application 502 may receive one or more inputs detected by the graphical user interface 504. In some instances, the provider application 502 may receive the one or more inputs from the respective enable buttons 254-264, the respective toggle buttons, such as the toggle button 304, and/or the respective install buttons 330-334 described above.

At step 534, the provider application 402 may be instructed to send the data 234-244 required to the one or more networks 508 to enable the one or more applications 214-224 to perform the one or more data transfers with the user account.

At step 536, the one or more networks 508 may send the data 234-244 to the one or more applications 510, including the one or more applications 214-224.

Figure 6:
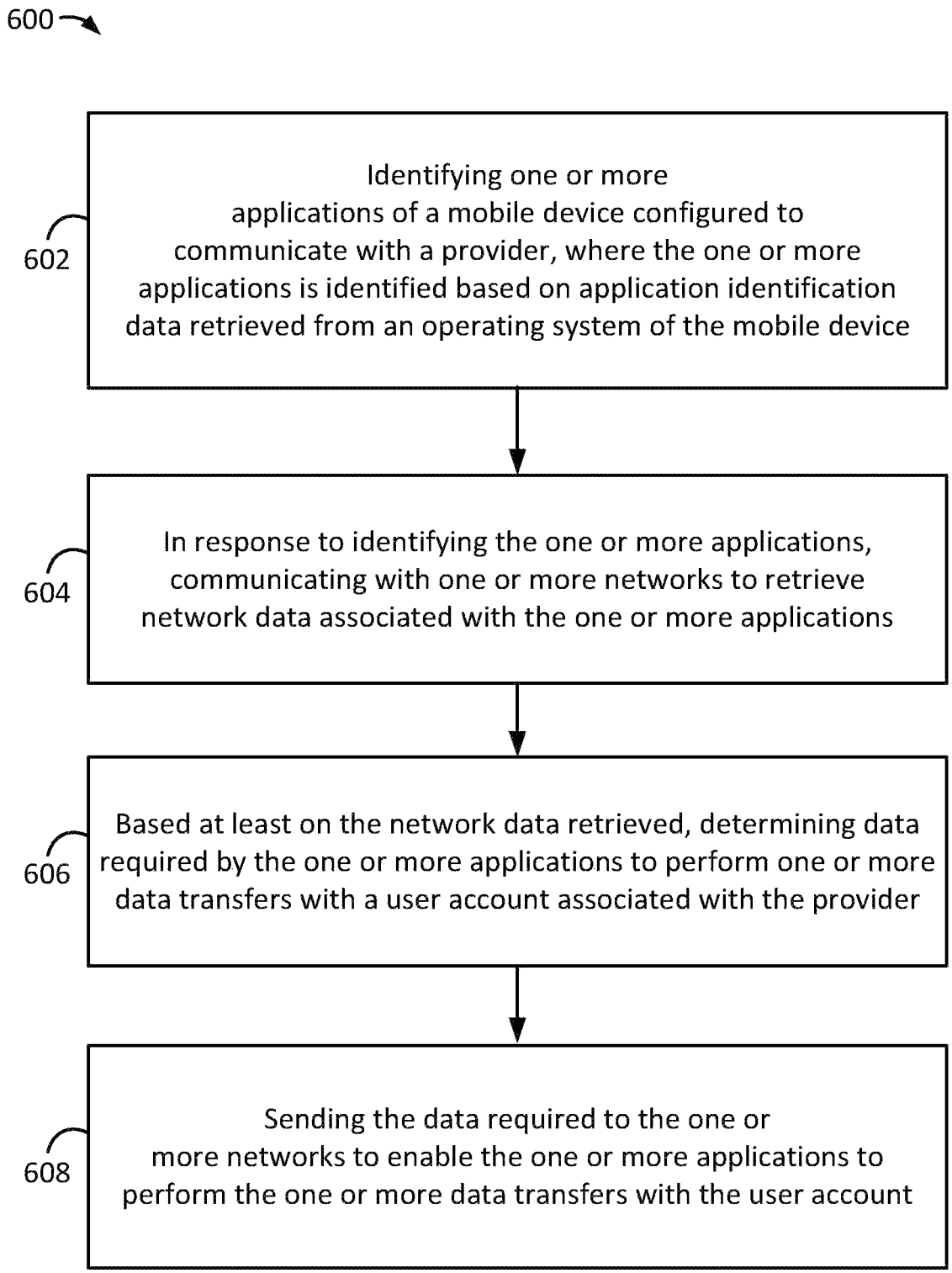
FIG. 6 illustrates an exemplary method, according to an embodiment.

FIG. 6 illustrates an exemplary method 600, according to an embodiment. Notably, one or more steps of the method 600 described herein may be omitted, performed in a different sequence, and/or combined with other methods for various types of applications contemplated herein.

At step 602, the method 600 may include identifying one or more applications of a mobile device configured to communicate with a provider, where the one or more applications is identified based on application identification data retrieved from an operating system of the mobile device. For example, the method 600 may include identifying one or more applications 214-224 of the mobile device 200 configured to communicate with one or more of the providers described herein. Further, the one or more applications 214-224 may be identified based on application identification data retrieved from an operating system of the mobile device 200.

At step 604, in response to identifying the one or more applications, the method 600 may include communicating with one or more networks to retrieve network data associated with the one or more applications. For example, in response to identifying the one or more applications 214-224, the method 600 may include communicating with one or more networks to retrieve network data associated with the one or more applications 214-224. In particular, the method 600 may include communicating with the one or more networks 108 and/or 508 described herein to retrieve the network data.

At step 606, based at least on the network data retrieved, the method 600 may include determining data required by the one or more applications to perform one or more data transfers with a user account associated with the provider. For example, the method 600 may include determining data 234-244 required by the one or more applications 214-224 to perform one or more data transfers with a user account associated with the provider.

At step 608, the method 600 may include sending the data required to the one or more networks to enable the one or more applications to perform the one or more data transfers with the user account. For example, the method 600 may include sending the data 234-244 required to the one or more networks to enable the one or more applications 214-224 to perform the one or more data transfers with the user account. As noted, the method 600 may include sending the data 324-244 required to the one or more networks 108 and/or 508 described herein to perform the one or more data transfers with the user account, e.g., the fund transfers with the user account.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
a non-transitory memory; and
one or more hardware processors coupled to the non-transitory memory and configured to read the instructions to cause the system to perform operations comprising:
displaying, via a graphical user interface of a provider application, a plurality of applications, wherein a plurality of user interface elements correspond to the plurality of applications, wherein the provider application corresponds to a different entity than the plurality of applications, and wherein the provider application is configured to provide the plurality of applications with access to a common user account, and wherein the plurality of applications includes a first application and a second application, with the first application requiring a different data type than the second application to access the common user account;
receiving a first user interaction with a first user interface element of the plurality of user interface elements, wherein the first user interface element corresponds to the first application, and wherein the first user interaction corresponds to switching the first user interface element into an active state;
determining that a first data type of a plurality of data types is required for the first application to access the common user account; and
in response to the determining that the first data type of the plurality of data types is required for the first application to access the common user account, transmitting, by the provider application, a first data corresponding to the first data type to the first application, wherein the transmitting the first data to the first application enables the first application to perform data transfers using the common user account.

2. The system of claim 1, the operations further comprising:
in response to receiving a second user interaction corresponding to switching the first user interface element into an inactive state, removing access to the common user account by the first application.

3. The system of claim 1, wherein the first data is a password, an email address, or a username corresponding to the common user account.

4. The system of claim 1, the operations further comprising:
causing a first data transfer by the first application using the common user account.

5. The system of claim 4, wherein the first data transfer is a monetary transfer.

6. The system of claim 4, wherein the first data transfer corresponds to retrieving a second data to generate a reservation corresponding to a merchant associated with the first application.

7. The system of claim 1, wherein each of the plurality of applications correspond to a different entity.

8. A method comprising:
displaying, via a graphical user interface of a provider application, a plurality of applications, wherein a plurality of user interface elements correspond to the plurality of applications, wherein the provider application corresponds to a different entity than the plurality of applications, and wherein the provider application is configured to provide the plurality of applications with access to a common user account, and wherein the plurality of applications includes a first application and a second application, with the first application requiring a different data type than the second application to access the common user account;
receiving a first user interaction with a first user interface element of the plurality of user interface elements, wherein the first user interface element corresponds to the first application, and wherein the first user interaction corresponds to switching the first user interface element into an active state;
determining that a first data type of a plurality of data types is required for the first application to access the common user account; and
in response to the determining that the first data type of the plurality of data types is required for the first application to access the common user account, transmitting, by the provider application, a first data corresponding to the first data type to the first application, wherein the transmitting the first data to the first application enables the first application to perform data transfers using the common user account.

9. The method of claim 8, further comprising:
in response to receiving a second user interaction corresponding to switching the first user interface element into an inactive state, removing access to the common user account by the first application.

10. The method of claim 8, wherein the first data is a password, an email address, or a username corresponding to the common user account.

11. The method of claim 8, further comprising:
causing a first data transfer by the first application using the common user account.

12. The method of claim 11, wherein the first data transfer is a monetary transfer.

13. The method of claim 11, wherein the first data transfer corresponds to retrieving a second data to generate a reservation corresponding to a merchant associated with the first application.

14. The method of claim 8, wherein each of the plurality of applications correspond to a different entity.

15. A computer program product comprising:
one or more computer-readable tangible storage devices, and program instructions stored on at least one of the one or more storage devices, the program instructions when executed cause a machine to perform operations comprising:
displaying, via a graphical user interface of a provider application, a plurality of applications, wherein a plurality of user interface elements correspond to the plurality of applications, wherein the provider application corresponds to a different entity than the plurality of applications, and wherein the provider application is configured to provide the plurality of applications with access to a common user account, and wherein the plurality of applications includes a first application and a second application, with the first application requiring a different data type than the second application to access the common user account;
receiving a first user interaction with a first user interface element of the plurality of user interface elements, wherein the first user interface element corresponds to the first application, and wherein the first user interaction corresponds to switching the first user interface element into an active state;
determining that a first data type of a plurality of data types is required for the first application to access the common user account; and
in response to the determining that the first data type of the plurality of data types is required for the first application to access the common user account, transmitting, by the provider application, a first data corresponding to the first data type to the first application, wherein the transmitting the first data to the first application enables the first application to perform data transfers using the common user account.

16. The computer program product of claim 15, the operations further comprising:
in response to receiving a second user interaction corresponding to switching the first user interface element into an inactive state, removing access to the common user account by the first application.

17. The computer program product of claim 15, wherein the first data is a password, an email address, or a username corresponding to the common user account.

18. The computer program product of claim 15, the operations further comprising:
causing a first data transfer by the first application using the common user account.

19. The computer program product of claim 18, wherein the first data transfer is a monetary transfer.

20. The computer program product of claim 18, wherein the first data transfer corresponds to retrieving a second data to generate a reservation corresponding to a merchant associated with the first application.

* * * * *